Figure 1:
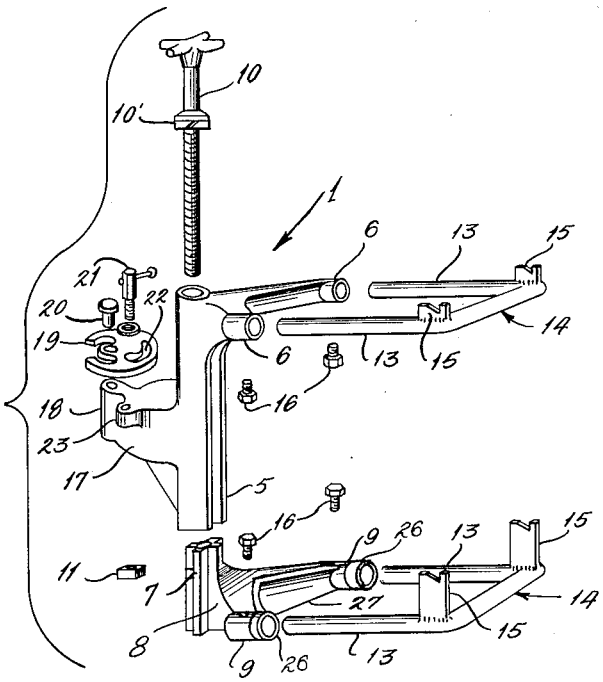

Oct. 14, 1952

A. N. MILSTER 2,613,949

BUMPER HITCH

Filed Feb. 19, 1949

2 SHEETS—SHEET 1

INVENTOR:
Archer N. Milster,
By Carr & Carr & Gravely,
HIS ATTORNEYS.

Oct. 14, 1952  A. N. MILSTER  2,613,949
BUMPER HITCH
Filed Feb. 19, 1949  2 SHEETS—SHEET 2
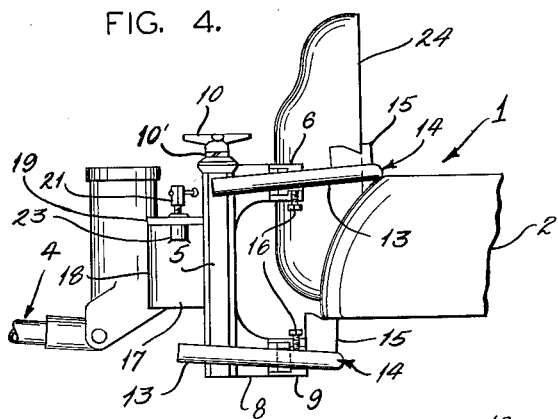
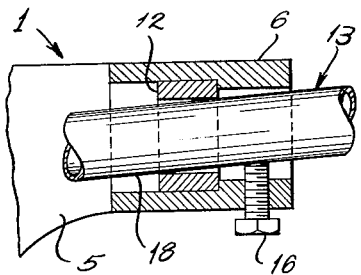
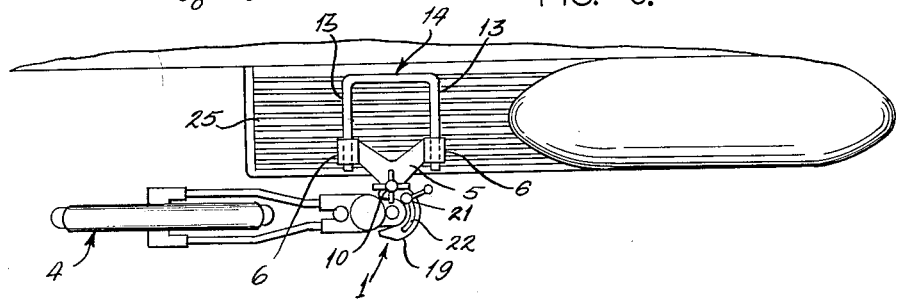
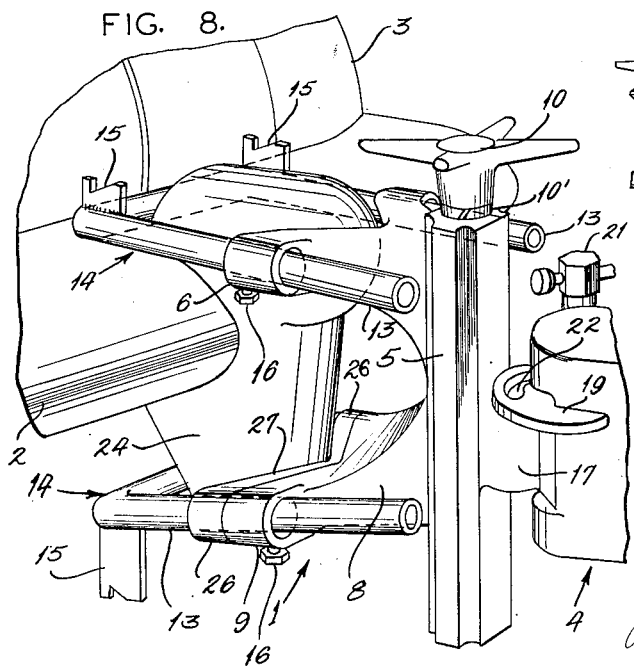
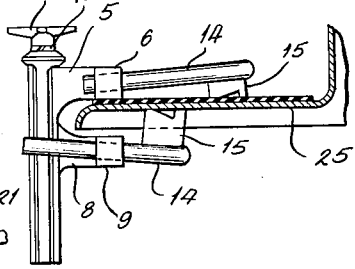
INVENTOR:
Arthur N. Milster,
By Carr & Carr & Gravely
HIS ATTORNEYS.

Patented Oct. 14, 1952

2,613,949

UNITED STATES PATENT OFFICE 2,613,949

BUMPER HITCH

Arthur N. Milster, St. Louis, Mo., assignor to Wagner Electric Corporation, St. Louis, Mo., a a corporation of Delaware Application February 19, 1949, Serial No. 77,381

9 Claims. (Cl. 280—33.44)

This invention relates to a coupling for connecting a drawn or trailer vehicle to a drawing or towing vehicle and is more particularly directed to a universal hitch or coupling, whereby a trailer vehicle may be readily connected to a towing vehicle regardless of the height of the towing vehicle bumper above the horizontal plane of the surface traversed.

The principal object of the invention is to provide a coupling or universal hitch for a trailer that is adjustable to the various widths of bumpers, the width of the bumper being the dimension along the longitudinal dimension of the towing vehicle, and which will accommodate itself to the vehicle bumpers regardless of their height above the horizontal surface or plane over which the towing vehicle travels.

Another object of the invention is to provide a universal hitch or coupling for a trailer vehicle that is securable to the rear bumper or to any other convenient part of the towing vehicle, such as one of the running-boards.

A further object of the invention is to provide an adjustable quadrant plate for a universal hitch or coupling that will limit the sway of the trailer vehicle regardless of the angle of attachment of the hitch or coupling to the towing vehicle.

The invention consists in providing a suitably shaped body member having projections thereon which constitute one jaw of a trailer hitch or coupling, and a member slidable on the body by means of a manually-operated adjusting screw, the member having projections thereon forming the lower jaw member. The invention also consists in providing U-shaped members that are slidably received in apertures formed in each of the projections, the U-shaped members having lugs or bits thereon that engage portions of the bumper or other parts of the towing vehicle in order to prevent release of the hitch or coupling therefrom. The invention also consists in providing an adjustable quadrant on the body to which the trailer is connected that prevents excessive side sway of the trailer as it is drawn by the towing vehicle.

Figure 2:
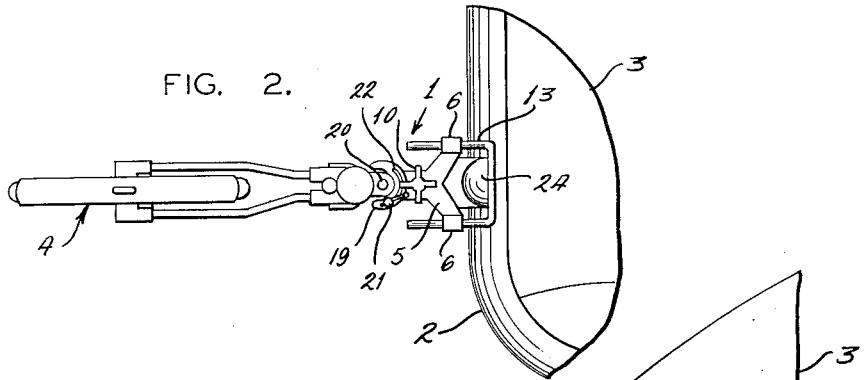
Figure 3:
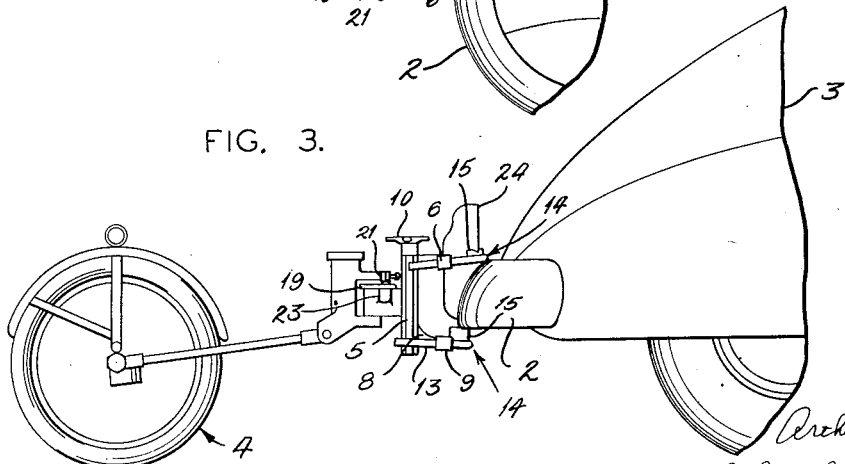

In the drawings:

Fig. 1 is a perspective view of the universal hitch in disassembled form and including an aligner, Fig. 2 is a plan view of the improved universal hitch attached to a towing vehicle and having a trailer secured thereto but omitting the aligner, Fig. 3 is a side elevational view of the mechanism illustrated in Fig. 1 but omitting the aligner, Fig. 4 is an enlarged elevational view of the universal hitch applied to the vehicle bumper but omitting the aligner, Fig. 5 is an enlarged detail view of the jaw member of the universal hitch, Fig. 6 is a plan view of the universal hitch applied to the running-board of the towing vehicle but omitting the aligner, Fig. 7 is a side elevational view of the assembly shown in Fig. 6 with the running-board shown in section; and Fig. 8 is a perspective view of the universal hitch when employing the aligner shown in Fig. 1.

The universal hitch or coupling 1 is applied to the bumper 2 of a towing vehicle 3 for drawing a trailer 4 similar in construction to the device illustrated in Paul G. Regna application Serial No. 574,543 filed January 25, 1945, now Patent 2,505,205, and is particularly adapted to all types of vehicle bumpers so that one universal hitch will be employable on the various vehicles to which the trailer 4 may be secured.

The universal hitch or coupling 1 comprises a body 5 having forked projections 6 thereon which constitute one jaw of the clamping portion of the coupling. The body 5 is suitably grooved to receive portions 7 on member 8. The member 8 is forked and has projections 9 thereon, complemental to projections 6, that constitute the lower jaw of the clamp for the coupling member. The member 8 is moved relative to body 5 by means of a manually-operated adjusting screw 10 that extends through an aperture in the body 5 and is threaded to a nut 11 secured to member 8 so that upon rotation of the adjusting screw, the member 8 will move relative to the body 5. A spring washer 10' is placed on screw 10 whose function is to prevent loosening of screw 10 after adjustment of the parts.

The projections 6 and 9 are suitably apertured and a hardened steel tubular member 12 with sharp edges (Fig. 5) is arranged therein. Slidably received in the tubular member 12 in each of the projections 6 and 9 are legs 13 of U members 14, each of which is provided with hooks 15. The U members may be locked in projections 6 and 9 by screws 16 for the purpose of holding them in adjusted position, the screws being located in the projections 6 and 9 to the right of tubular member 12, as viewed in Fig. 5.

The body 5 is provided with a bracket 17 having an apertured projection 18 thereon to which a quadrant plate 19 is pivotally secured by means of a pin 20. The plate 19 is locked in adjusted position by means of a locking screw 21 that extends through an arcuate slot 22 cut in the quadrant plate, the slot being concentric to the axis of rotation of the quadrant plate. The locking screw 21 is threaded into a tapped projection 23 formed on bracket 17.

The universal hitch or coupling is applied to the towing vehicle by spreading the jaws of the coupling so that they will embrace the bumper regardless of its shape. When the bumper is provided with a guard member such as 24, the upper U member 14 is hooked over the bumper guard and the lower U is adjusted in projections 9 until the hooks 15 thereon engage the lower edge of the bumper. The clamping screw 10 is then rotated until the jaws are brought together so there will be no relative motion between the parts of the universal hitch and the bumper and in which hooks 15 will firmly engage the lower edge of the bumper. In instances where the bumper bar is disposed at a sharp angle to the horizontal, the U members 14 are adjusted to grip the upper and lower edges of the bumper or the guard, where one is provided, and thus be clamped securely thereto. In the event the bumper is not equipped with guards, the upper U member may be reversed in position so that hooks 15 thereon face downwardly or toward the hooks on the lower U member; and as the jaws are moved toward or away from each other, the hooks then engage the edges of the bumper or may be hooked behind the bumper guard, depending upon whichever expedient is the more convenient.

Figs. 6 and 7 illustrate the mode of securement of the hitch to the running-board 25 of a towing vehicle. The U members 14 are placed in projections 6 and 9 so that the hooks 15 face each other, and when member 8 is moved toward the jaw on body 5, the projections 6 and 9 and the hooks 15 will clamp the running-board 25 therebetween.

The bumpers 2 of certain vehicles are provided with guards 24 that are inclined from the vertical, such as illustrated in Fig. 8. The guard 24 may extend substantially below bumper 2 or it may extend above it, but in either event an aligner or spacer 27 provided with projections 26 is positioned between one of the jaws formed by the projections 6 or 9 and the bumper guard 24 and on either of the U members 14 in order that the axis of the adjusting screw 10 may be maintained vertical. The aligner 27 has its projections 26 spaced and dimensioned so that they will coincide with projections 6 or 9, depending upon whether the bumper guard 24 extends above or below the bumper 2.

The universal hitch described above is particularly applicable to distance recording or measuring devices, and the accuracy of the readings taken thereon is dependent upon the alignment of the trailer with the towing vehicle.

The purpose of the tips on quadrant plate 19 is to permit the necessary automatic alignment of the trailer with the towing vehicle during forward movement to prevent tire scuffing (i. e. to permit a "caster" action of the wheel) but at the same time to hold the wheel to a path approximating that of the vehicle during reverse movement. If the wheel were not so held, it would swing out of the line of travel and probably be injured.

What I claim is:

1. A trailer coupling comprising a body having apertured projections formed thereon constituting one jaw of a clamp; a member adjustably mounted on said body and having apertured projections formed thereon constituting the other jaw of the clamp; a U-shaped member adjustably mounted in the apertured projections of said body for embracing one portion of a bumper; a U-shaped member adjustably mounted in the apertured projections of said member for embracing a portion of the bumper opposite to that embraced by said means; and means for moving said member relative to said body for clamping the bumper between said jaws.

2. A trailer coupling comprising a body having spaced apertured projections thereon forming a jaw for a bumper clamp; a member slidably received in said body and provided with spaced apertured projections on axes parallel to and vertically aligned with the projections on said body and constituting a second jaw for the bumper clamp; a U-shaped member whose legs are slidably received in the projections of said body and engageable with a portion of the bumper; a second U-shaped member whose legs are slidably received in the projections of said member and engageable with the portion of the bumper vertically aligned with said U-shaped member; and means for moving said U-shaped members toward and away from each other for clamping the bumper therebetween.

3. A trailer coupling comprising a body having spaced apertured projections thereon adapted for positioning above an automobile bumper; a member slidably mounted on said body and provided with apertured projections adapted for positioning below the bumper; a U-shaped member having legs that extend through said projections on said body; a U-shaped member having legs that extend through the projections on said member; means for adjustably mounting said legs in each of said projections; and means for moving said body relative to said member for clamping said U-shaped members to said bumper which comprises a screw and a nut.

4. A trailer coupling comprising a body having spaced apertured projections to be positioned above an automobile bumper having a guard thereon; a member slidably mounted on said body and provided with apertured projections to be positioned below the bumper; a U-shaped member having legs that extend through said projections on said body; a U-shaped member having legs that extend through the projections on said member; means for adjustably mounting said legs in said projections; means for moving said body relative to said member for clamping said U-shaped members to said bumper which comprises a screw in said body and a nut on said member; a member pivoted to said body and to which a trailer is connectible; and an adjustable quadrant member mounted on said body for limiting the swinging motion of the trailer.

5. A trailer coupling comprising a body having spaced apertured projections adapted to be positioned above an automobile bumper; a member slidably mounted on said body and provided with apertured projections adapted to be positioned below the bumper; a U-shaped member having legs that extend through said projections on said body; a U-shaped member having legs that extend through the projections on said member; means for adjustably mounting said legs in said projections; means on each of said U-shaped members for preventing said members from slipping off said bumper; and means for moving said body relative to said member for clamping said U-shaped members to said bumper which comprises a screw and a nut.

6. A trailer coupling comprising a body having spaced apertured projections to be positioned above an automobile bumper having a guard thereon; a member slidably mounted on said body and provided with apertured projections to be positioned below the bumper; a U-shaped member having legs that extend through said projections on said body; a U-shaped member having legs that extend through the projections on said member for fitting over said guard; means for adjustably mounting said legs in said projections; a screw for moving said body relative to said member for clamping said U-shaped members to said bumper which comprises a screw in said body and a nut on said member; and means on said screw for preventing movement therein after said member has been adjusted relative to said body.

7. A trailer coupling comprising a body having spaced apertured projections adapted to be positioned above an automobile bumper; a member slidably mounted on said body and provided with apertured projections adapted to be positioned below the bumper; a U-shaped member having legs that extend through said projections on said body; a U-shaped member having legs that extend through the projections on said member; means for adjustably mounting said legs in said projections; means on each of said U-shaped members for preventing said members from slipping off said bumper; an adjusting screw for moving said body relative to said member for clamping said U-shaped members to said bumper which comprises a screw in said body and a nut on said member; and aligning means mountable on one of said U members and disposed adjacent to said bumper and the jaw member in which the last mentioned U member is mounted for enabling the adjusting screw to remain vertical when the coupling is applied to a bumper whose plane is inclined to the vertical.

8. A trailer coupling comprising a body having a pair of apertured projections formed thereon constituting one jaw of a clamp; a member adjustably mounted on said body and having a pair of apertured projections formed thereon constituting the other jaw of the clamp; a U-shaped member adjustably mounted in said apertured projections of said body for application to one side of a member projecting from a vehicle to be tested; a U-shaped member adjustably mounted in the apertured projections of said member for application to the other side of said projecting member and disposed opposite to said means; and means for moving said member relative to said body for clamping the projecting member between said jaws.

9. A trailer coupling comprising a body having spaced apertured projections thereon forming a jaw for a running board clamp; a member slidably received in said body and provided with spaced apertured projections on axes parallel to and vertically aligned with the projections on said body constituting a second jaw for the running board clamp; a U-shaped member whose legs are slidably received in the projections of said body and engaging one side of the running board; a second U-shaped member whose legs are slidably received in the projections of said member and engaging the other side of said running board and vertically aligned with said U-shaped member; and means for moving said U-shaped members toward and away from each other for clamping the running board therebetween.

ARTHUR N. MILSTER.

REFERENCES CITED

The following references are of record in the file of this patent:

UNITED STATES PATENTS

| Number | Name | Date |
|---|---|---|
| 808,602 | Fergusson | Dec. 26, 1905 |
| 1,248,103 | Godley | Nov. 27, 1917 |
| 2,089,400 | Morris | Aug. 10, 1937 |
| 2,306,007 | Thorp | Dec. 22, 1942 |
| 2,458,667 | Williams | Jan. 11, 1949 |